United States Patent [19]
Seidensticker

[11] 3,786,601
[45] Jan. 22, 1974

[54] APPARATUS FOR DE-BURRING OR CHAMFERING OF GEARS

[76] Inventor: Horst Seidensticker, Lonkert 32, Brackwede, Germany

[22] Filed: July 1, 1971

[21] Appl. No.: 158,876

[30] Foreign Application Priority Data
July 2, 1970 Germany............ P 20 32 759.7

[52] U.S. Cl..................... 51/129, 51/287, 90/1.6 A
[51] Int. Cl............................................ B24b 5/02
[58] Field of Search 51/129, 105 HB, 123 G, 95 GH, 51/287, 206 P, 209; 90/1.4, 1.6, 1.6 A; 29/103, 103 C

[56] References Cited
UNITED STATES PATENTS
1,640,991  8/1927  Hanson............................ 51/206 P
2,607,175  8/1952  Osplack............................ 51/287
2,860,453  11/1958  Frey............................ 51/287 UX
494,471  3/1893  Gardner......................... 51/209 S X Primary Examiner—Harold D. Whitehead
Assistant Examiner—Nicholas P. Godici
Attorney, Agent, or Firm—Michael S. Striker

[57] ABSTRACT

An apparatus for de-burring or chamfering of gears has at least one disk member of abrasive material one or both major surfaces of which are provided with helical or concentric ribs of the abrasive material. The ribs have a cross-sectional profile corresponding to that of the teeth on gears to be processed, and a drive is provided which rotates the disk member about its axis of rotation which is encircled by the ribs.

9 Claims, 5 Drawing Figures

APPARATUS FOR DE-BURRING OR CHAMFERING OF GEARS

BACKGROUND OF THE INVENTION

The present invention relates generally to an apparatus for processing of gears, and more particularly to an apparatus for de-burring or chamfering of gears.

It is already known to provide apparatus by means of which gears, that is the teeth thereon, can be either chamfered or de-burred. Such apparatus, of which that disclosed in German allowed application No. 1,053,286 is representative, operates well for its intended purpose. It does, however, have a certain disadvantage: namely the fact that such apparatus is suitable only for the processing of straight-toothed spur gears and inclined-tooth spur gears with a small angle of inclination. A universal applicability of the apparatus, that is the possibility of using such apparatus also for the processing of straight-toothed gears as well as gears having inclined teeth with any desired angle of inclination, does not exist.

BACKGROUND OF THE INVENTION

It is, accordingly, an object of the present invention to provide an improved apparatus of the type under discussion.

More particularly it is an object of the present invention to provide an improved apparatus for de-burring or chamfering of gears which can be utilized with all types of gears and irrespective of whether the teeth of the gears are straight or are inclined, and again without regard to the angle of inclination of the teeth.

A concomitant object of the invention is to provide such an improved apparatus which in addition to its universal applicability has a high capacity.

In pursuance of the above objects, and of others which will become apparent hereafter, one feature of the invention recites, in an apparatus which is suitable for deburring or chamfering of gears, in the provision of at least one disk member of abrasive material having an axis of rotation and two major surfaces. Raised rib means of the abrasive material is provided on at least one of the major surfaces and encircles the axis of rotation, either in helical form or in the form of circular ribs which are concentric with one another and with the axis of rotation. The rib means has a cross-sectional profile corresponding to that of the teeth on gears to be processed. Drive means rotates the disc member about its axis of rotation.

Located above the normally upwardly directed major surface provided with the rib means are means for the exact turnable mounting of the gear to be processed, for instance a plate member whose abutment surface includes an acute angle with the major surface of the disk member and is provided with a shaft or a projection over which a gear to be processed can be slipped to abut and rest on the abutment surface. It is also advantageous to rovide means which engage with the gear to be processed and which effect a turning movement of the gear in accordance with the pitch of the rib means if the latter is of helical convolution. This prevents a one-sided de-burring or chamfering of the teeth from the gear being processed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
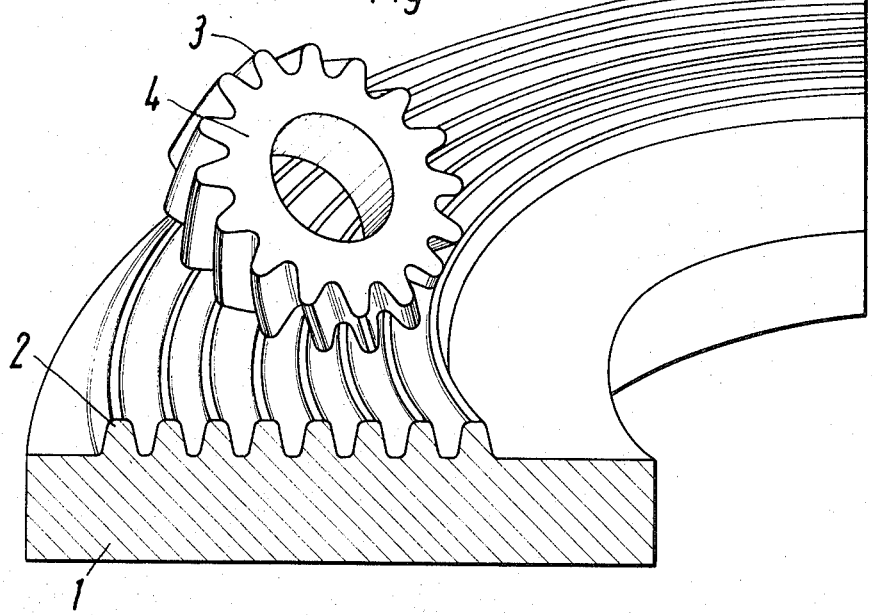
FIG. 1 is a partially sectioned perspective view illustrating a sector of a disk member used in an embodiment according to the present invention, shown with a gear being processed.
Figure 2:
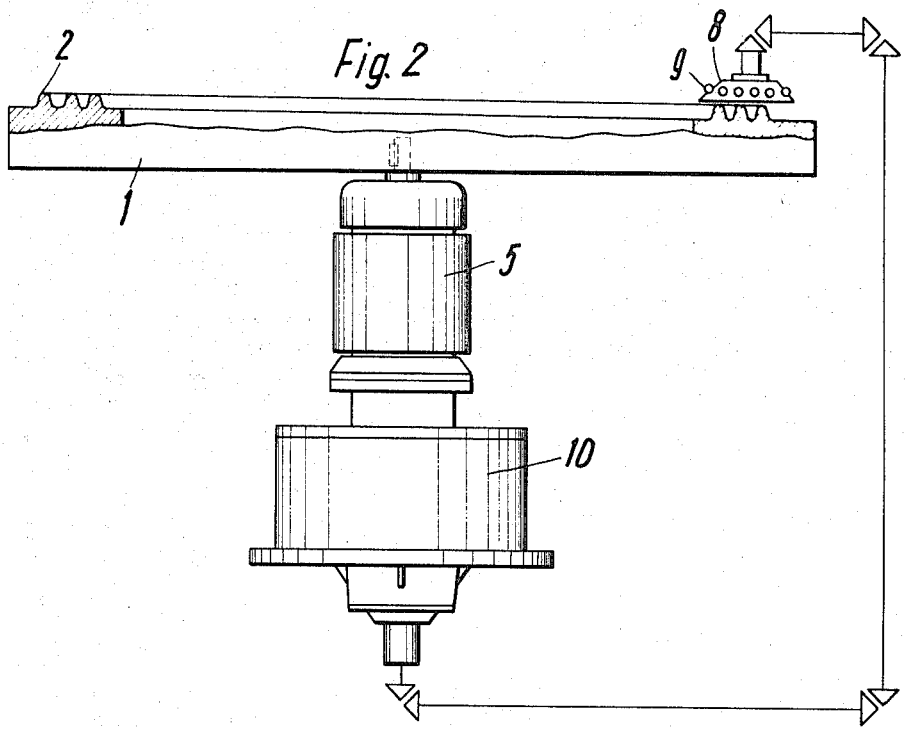
FIG. 2 is a diagrammatic side-elevational view, partly in section, illustrating an embodiment of the invention in somewhat diagrammatic manner.

Discussing now the drawing in detail, and firstly the embodiment in FIGS. 1 and 2 thereof, it will be seen that the disk member 1 for de-burring or chamfering of the teeth on gears is in the illustrated embodiment of annular configuration. It will be appreciated that FIG. 1 shows only a sector of this annular disk member 1 which, as the section in FIG. 1 indicates, is composed (or at least predominantly composed) of a suitable abrasive material well known per se. At least one (here the upwardly directed one) of the two major surfaces of the disk member 1 is provided with raised ribs of the same abrasive material as the disk member 1 (of one piece therewith) which in the illustrated embodiment are helical and encircle the center or axis of rotation of the disk member 1. The cross-section profile of the ribs 2 corresponds to the profile of the teeth 3 of a gear 4 which is to be processed, that is which is to be de-burred or chamfered.

FIG. 2 shows that in the illustrated embodiment the disk member 1 is mounted on the output shaft of an electromotor 5, but of course other drives can also be provided for this purpose.

Figure 3:
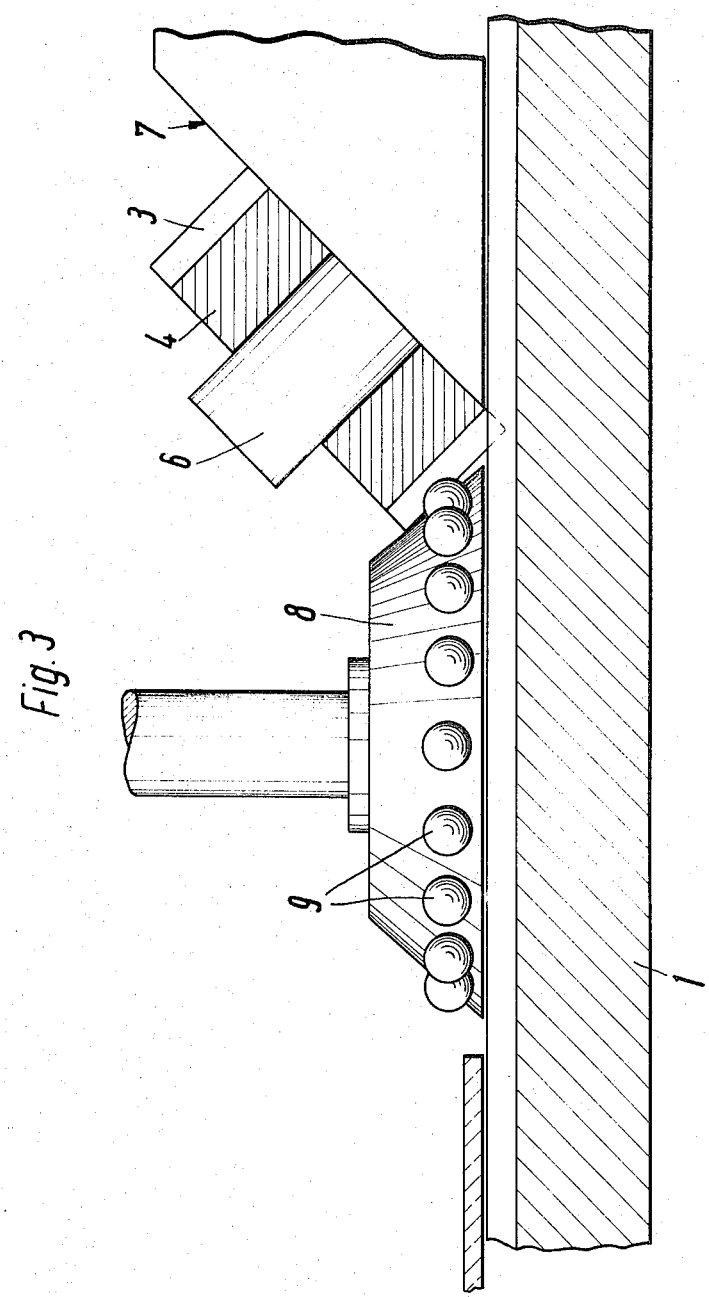
FIG. 3 is a fragmentary sectional elevational through a disk member and mounting and control means for the gear to be processed.

In FIG. 3 I have illustrated that according to an advantageous embodiment the gear 4 whose teeth are to be de-burred or chamfered, can be supported on an abutment surface 7 of a mounting arrangement by having a pin or projection 6 extending from the abutment surface 7 and passing through the central opening of the gear 4. The inclination of the abutment surface 7 with reference to the upper surface of the disk member 1, and thus the axis of rotation of the disk member 1 which is defined by the output shaft of the motor 5 (compare FIG. 2) is such that the surface 7 includes with the axis of rotation of the disk member 1 an acute angle, here of approximately 45°. In other words, the downwardly directed axial end face of the gear 4 (that which abuts the abutment surface 7) includes with the upwardly directed surface of the disk member 1 a similar acute angle of approximately 45°. The teeth 3 provided at the circumference of the gear 4 engage with the spiral rib 2. According to this inclination of the gear 4 the ribs 2 are of slightly bulkier profile than the teeth 3 of the gear 4. It will be appreciated that when the ribs 2 in this embodiment are configurated as a single spiral, the gear 4 will be advanced incrementally by one tooth with each complete rotation of the disk member 1.

Figure 4:
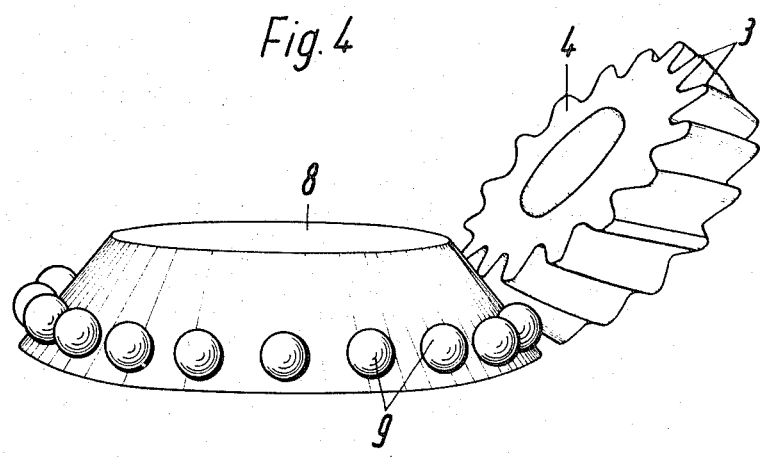
FIG. 4 is a perspective view of an element of FIG. 4, shown in engagement with the gear to be processed.

In order to eliminate the possibility that the gear 4 might lag behind and that the teeth might be chamfered or de-burred at only one side, FIGS. 2-4 show the provision of a guide or support wheel 8 which is turnably mounted in suitable manner above the upwardly directed surface of the disk member 1. Its frusto-conical outer peripheral surface is provided in the illustrated embodiment with substantially ball-shaped engaging portions 9 which are distributed in accordance with the tooth distribution of the gear to be processed and which engage between successive teeth of the gear 4 when the latter is in processing position as illustrated in FIG. 3.

FIG. 2 shows that the motor 5 which rotates the disk member 1 also drives the member 8 in rotation, via a reduction gear 10 which is known per se and therefore illustrated only diagrammatically, so that during each rotation of the disk member 1 the member 8 will be incrementally advanced by the distance between two successive ones of the members 9.

When the device according to the present invention is to be used for processing spur gears having straight teeth, the support means having the abutment surface 7 is so positioned that its underside extends radially with reference to the axis of rotation of the disk member 1. If the gears to be treated or processed have inclined teeth, however, then the support means having the surface 1 is so adjusted in the plane or in parallelism with the plane of the disk member 1 that its underside or under edge includes with the aforementioned radial direction an angle which corresponds to the respective angle of inclination of the teeth. This means that with a disk member 1 which is accommodated to a particular tooth modulus, correspondingly modulated gears with any desired number of teeth and any angle of tooth inclination which is encountered in practical application, can be properly de-burred and/or chamfered in a very short period of time, usually in a fraction of a minute.

FIG. 4 is self-explanatory in that it shows in perspective the engagement of the gear 4 with the member 8 which is illustrated in FIG. 3.

Figure 5:
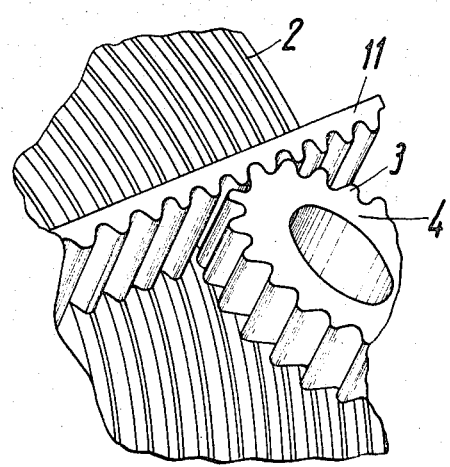
FIG. 5 is a perspective view of a further embodiment of the invention.

In FIG. 5 I have shown an embodiment which differs from the preceding in that the member 8 is replaced as a guidance and take-along component by a toothed rack 11 which is advanced by one increment (analogously to the rotation of the member 8) during each complete revolution of the single-spiral disk member 1.

Of course, as already indicated above the ribs 2 need not be provided in form of a single spiral. Thus, there can be provided in form of two or more concentric annuli which are concentric with one another and with the axis of rotation of the disk member 1. In this case, however, the gears to be processed must be rolled on the surface of the disk member 1 in radial direction or, if they have inclined teeth, in a direction which deviates from the radial in accordance with the angle of inclination of the teeth. This, however, will be readily evident to those skilled in the art and therefore requires no detailed discussion.

It will be understood that each of the elements described above, or two or more together, may also find a useful application in other types of constructions differ from the types described above.

While the invention has been illustrated and described as embodied in an apparatus for processing of gears, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus of the character described, particularly for deburring or chamfering of gear teeth edges, in combination, at least one disk member of abrasive material, having an axis of rotation and two major surfaces which extend transverse to and face in mutually opposite directions of said axis of rotation; raised rib means of said abrasive material provided on at least one of said major surfaces and having a cross-sectional profile corresponding to that of teeth on a gear to be processed; mounting means above said one major surface and including a support having an abutment surface whose plane is inclined at an acute angle relative to said axis of rotation, and a mounting projection projecting from said abutment surface and adapting to extend into a center aperture of a gear to be mounted; and drive means for rotating said disk member about said axis of rotation thereof.

2. In an apparatus as defined in claim 1, wherein said rib means comprises a helical rib having a plurality of convolutions.

3. In an apparatus as defined in claim 1, wherein said rib means comprises a plurality of circular ribs concentric with one another and with said axis of rotation.

4. In an apparatus as defined in claim 1, said one major surface normally facing in upward direction; and further comprising mounting means above said one major surface for mounting a gear to be processed.

5. In an apparatus as defined in claim 1, said one major surface normally facing in upward direction; and further comprising mounting means above said one major surface for mounting and rotating a gear to be processed.

6. In an apparatus as defined in claim 1, said one major surface normally facing in upward direction; and further comprising mounting means above said one major surface for mounting a gear to be treated, said mounting means being adjustable with reference to said disk member in parallelism with the general plane of said one major surface.

7. In an apparatus of the character described, particularly for de-burring or chamfering of gear-tooth edges, in combination, at least one disk member of abrasive material, having an axis of rotation and two major surfaces which extend transverse to and face in mutually opposite directions of said axis of rotation; raised rib means of said abrasive material provided on at least one of said major surfaces which normally faces upwardly and encircling said axis of rotation, said rib means having a cross-sectional profile corresponding to that of teeth on a gear to be processed; mounting means above said one major surface for mounting and rotating a gear to be processed and including a support and a turnable support member provided with engaging portions adapted to engage with a gear supported on said support; and drive means for rotating said disk member about said axis of rotation thereof.

8. In an apparatus as defined in claim 7; and further comprising coupling means coupling said support member for joint rotation with said disk member so that the former is turned incrementally with each revolution of the latter.

9. In an apparatus as defined in claim 8, said coupling means comprising a reduction gear.

* * * * *